(12) United States Patent
Gisin et al.

(10) Patent No.: US 7,580,524 B2
(45) Date of Patent: Aug. 25, 2009

(54) METHOD AND APPARATUS FOR SYNCHRONIZING THE EMITTER AND THE RECEIVER IN AN AUTOCOMPENSATING QUANTUM CRYPTOGRAPHY SYSTEM

(75) Inventors: Nicolas Gisin, Vessy (CH); Olivier Guinnard, Geneva (CH); Grégoire Ribordy, Geneva (CH); Hugo Zbinden, Geneva (CH)

(73) Assignee: Universite De Geneve, Geneva (CH)

( * ) Notice: Subject to any disclaimer, the term of this patent is extended or adjusted under 35 U.S.C. 154(b) by 452 days.

(21) Appl. No.: 10/384,822

(22) Filed: Mar. 11, 2003

(65) Prior Publication Data

US 2003/0231771 A1      Dec. 18, 2003

(51) Int. Cl.
*H04K 1/00* (2006.01)
*G06F 1/12* (2006.01)

(52) U.S. Cl. .................. 380/256; 380/257; 380/258; 380/259; 380/260; 713/400; 713/401

(58) Field of Classification Search .................. 380/256
See application file for complete search history.

(56) References Cited

U.S. PATENT DOCUMENTS

| | | | |
|---|---|---|---|
| 5,506,878 A * | 4/1996 | Chiang | 377/39 |
| 5,768,378 A | 6/1998 | Townsend et al. | |
| 5,850,441 A * | 12/1998 | Townsend et al. | 380/283 |
| 6,438,234 B1 * | 8/2002 | Gisin et al. | 380/256 |
| 7,006,635 B2 * | 2/2006 | Parks et al. | 380/263 |
| 2004/0208634 A1 * | 10/2004 | Nishimura et al. | 398/183 |

OTHER PUBLICATIONS

"An Autocompensating Fiber-Optic Quantum Cryptography System Based on Polarization Splitting of Light" (IEEE; Bethune, Jun. 1999).*
Donald S Bethune et al., "Autocompensating quantum cryptography", 2002 New J. Phys. 4 42.
Gisin, N et al, "Quantum Cryptography", *Reviews of Modern Physics*, vol. 74, No. 1, Jan. 2002.
Ribordy, G. et al, "Automated 'plug & play' quantum key distribution", *Electronics Letters*, Oct. 29, 1998, vol. 34, No. 22, p. 2116-2117.

* cited by examiner

*Primary Examiner*—Longbit Chai
(74) *Attorney, Agent, or Firm*—Browdy and Neimark, P.L.L.C.

(57) ABSTRACT

In a method and apparatus for synchronizing the receiver and the emitter in an autocompensating quantum cryptography system it is allowed to one of the stations (for example the emitter) to define the timing of all its operations (for example the application of a signal onto the modulator used to encode the values of the bits) as a function of a time reference. This time reference can either be transmitted using a channel from the other station (for example the receiver). It can also consist of a time reference synchronized with that of the other station through using information transmitted along a channel and a synchronization unit. Preferably a time reference unit is provided at each station. One of these time reference units functions as a master, while the other one function as a slave. The slave is synchronized with the master using information transmitted over a communication channel by a synchronization unit.

9 Claims, 2 Drawing Sheets

Synchronization of a slave time reference unit used to generate timing information with a master reference unit using a time reference channel and a synchronization unit in an autocompensation quantum cryptography system.

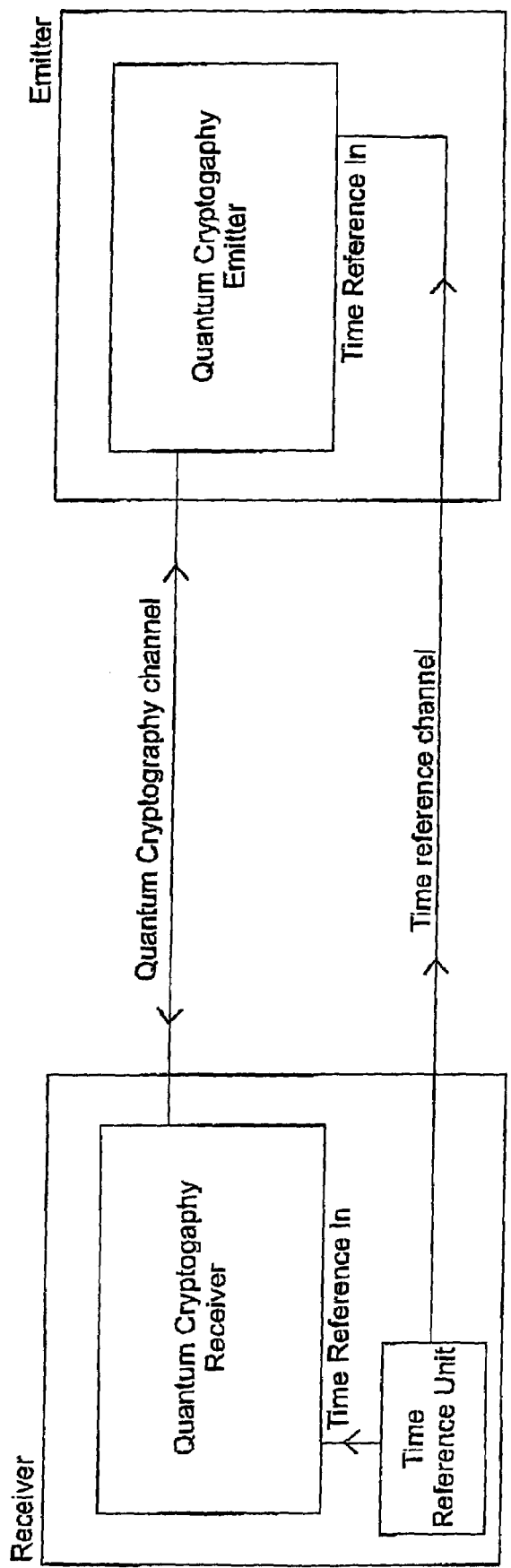
Figure 1: Transmission of the time reference signal used to generate the timing information from one station of an autocompensating quantum cryptography system to the other one.

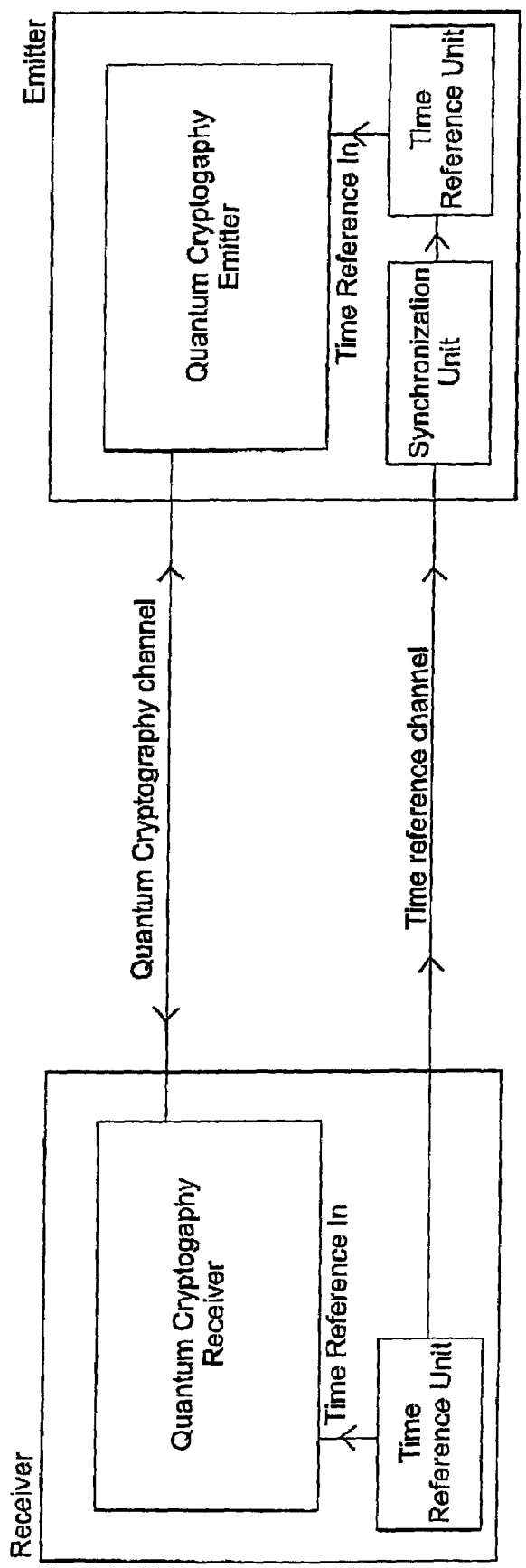
Figure 2: Synchronization of a slave time reference unit used to generate timing information with a master reference unit using a time reference channel and a synchronization unit in an autocompensation quantum cryptography system.

METHOD AND APPARATUS FOR SYNCHRONIZING THE EMITTER AND THE RECEIVER IN AN AUTOCOMPENSATING QUANTUM CRYPTOGRAPHY SYSTEM

BACKGROUND OF THE INVENTION

1. Field of the Invention

This invention relates generally to the field of quantum cryptography, and more particularly to a method and apparatus for synchronizing the emitter and the receiver in an autocompensating quantum cryptography system.

2. Description of the Related Art

Quantum cryptography (QC) is a technique that allows two remote parties, an emitter and a receiver, to exchange in a secure and private way a sequence of bits to be used as a cryptographic key. The bits are encoded on individual two-levels quantum systems, like for example single photons, and transmitted over a quantum channel, like for example an optical fiber. According to the laws of quantum physics, an eavesdropper will necessarily introduce perturbations in the sequence of bits shared by the emitter and the receiver.

After the exchange of a large number of bits, the two parties perform key distillation. In the course of this procedure, they check the perturbation level on a sample of the bit sequence, also know as quantum bit error rate (QBER), in order to assess the secrecy of the transmission. In principle, errors should be encountered only in the presence of an eavesdropper. In practice however, because of the imperfections of the apparatus, a non-zero error probability is always observed Provided this probability is not too large, it does not prevent the distillation of a secure key. These errors can indeed be corrected, before the two parties apply a so called privacy amplification algorithm that will reduce the information level of an eavesdropper.

Various QC systems have been built by research groups (see Nicolas Gisin, Grégoire Ribordy, Wolfgang Tittel, and Hugo Zbinden, "Quantum Cryptography", Reviews of Modern Physics 74, pages 145-190 (2002) for a survey). In real systems, one of the main difficulties is to reach a small error probability, even in the absence of an eavesdropper The overall error probability is the addition of several components. One of these components is linked to the so-called "dark counts" level of the photon counting detectors used to register the single photons. A second probability is related to the intrinsic contrast of the optical arrangement. This contrast must be as good as possible, and should not depend on too many f actors so that it does not vary over time.

One class of systems, the autocompensating systems developed at the University of Geneva by Hugo Zbinden, Jean-Daniel Gautier, Nicolas Gisin, Bruno Huttner, Antoine Muller, and Wolfgang Tittel, published within the article "Interferometry with Faraday mirrors for quantum cryptography", Electronics Letters 7, 586-588 (1997) and furthermore published as WO 98/10560, utilizes the phase of the photons to encode the value of the bits. Because of time multiplexing and polarization fluctuations compensation by a Faraday mirror, the contrast of these systems is intrinsically high and stable. They are thus very well suited for QC in optical fibers. Contrary to other arrangements, with autocompensating systems, an intense light pulse is sent on the quantum channel by the receiver to the emitter, who then attenuates it to the quantum level, encodes the value of a bit and reflects it back to the receiver.

One difficulty is for the emitter to know when to encode the value of a bit. This is particularly true because in practice sequences of pulses are travelling in the fiber. The emitter must accurately know which bit value he encoded on which particular pulse. The solution used until now involved the detection of the classical pulse by the emitter, the generation of an electronic signal which is delayed by the appropriate time before triggering the modulator used to encode the value of the bit.

The first problem with this approach is that if the emitter fails to register one of the intense pulses, his sequence of bits will be shifted with respected to that of the receiver.

A second problem comes from the fact that in autocompensating systems, intense pulses travel from the receiver to the emitter, while faint pulses travel back from the emitter to the receiver. In order to keep the error probability low, it is essential to discriminate between the faint pulses reflected by the emitter and the photon backscattered from intense pulses (Rayleigh back-scattering).

One possibility, proposed by Grégoire Ribordy, Jean-Daniel Gautier, Nicolas Gisin, Olivier Guinnard and Hugo Zbinden, in "Automated 'plug & play' quantum key distribution", Electronics Letters 34, 2116-2117 (1997), is to discriminate temporally between these photons. The emitter then has a storage system—a long optical fiber—placed behind the attenuator. The pulses are sent in the form of trains by the receiver. The length of a train is smaller or equal to twice the length of the storage line, so that the intersection of the pulses takes place behind the attenuator. In this case, the emitter's modulator is located after the storage line, which means that the delay between the detection of an intense pulse and its arrival at the phase modulator is large. In addition this delay is larger than the time separating two subsequent pulses in a train. The delay generator must thus allow the input of several pulses before the delayed output of the first pulse. This is difficult to achieve with electronic circuits. One can use an optical delay line, but this is costly and unpractical.

SUMMARY OF THE INVENTION

The primary object of the invention is to allow to synchronize the emitter and the receiver in an autocompensating quantum cryptography system.

Another object of the invention is to allow the emitter in an autocompensating quantum cryptography system to define the timing of the signals applied on the modulator used to encode the values of the bits.

Another object of the invention is to allow to use low precision time reference in an autocompensating quantum cryptography system.

The method and apparatus for synchronizing the receiver and the emitter in an autocompensating quantum cryptography system allows one of the stations (for example the emitter) to define the timing of all its operations (for example the application of a signal onto the modulator used to encode the values of the bits) as a function of a time reference. This time reference can either be transmitted using a channel from the other station (for example the receiver). It can also consist of a time reference synchronized with that of the other station using information transmitted along a channel and a synchronization unit.

A preferred embodiment includes a time reference unit at each station. One of these time reference units functions as a master, while the other one function as a slave. The slave is synchronized with the master using information transmitted over a communication channel by a synchronization unit.

DESCRIPTION OF THE DRAWINGS

Other objects and advantages of the present invention will become apparent from the following descriptions, taken in connection with the accompanying drawings, wherein, by way of illustration and example, an embodiment of the present invention is disclosed.

FIG. 1 shows the transmission of the time reference signal used to generate the timing information from one station of an autocompensating quantum cryptography system to the other one; and FIG. 2 shows the synchronization of a slave time reference unit used to generate timing information with a master reference unit using a synchronization channel and a synchronization unit providing a correction signal in an auto-compensation quantum cryptography system.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We propose that the timing of all the electronic signals in an autocompensating quantum cryptography system is based upon a time reference unit. The various delay can then be generated by counting pulses of a time reference signal and adding a short adjustable delay, whose maximum duration is shorter than the period of the time reference signal.

In such an autocompensating quantum cryptography system, the time reference of both stations—the emitter and the receiver—must be synchronized to each other, if the various delays are to be precise and reproducible.

We propose that a single master time reference signal is generated by one of the stations—for example the receiver—and transmitted to the other station—the emitter for example—through a channel to the emitter as shown in FIG. 1). This transmission can take place continuously or periodically.

The said channel can consist for example of an electric cable carrying a varying voltage or an optical fiber transmitting light pulses coincident with the time reference signal.

The said master time reference unit can be located in either of the stations.

The said time reference signal can for example consist of the intense light pulses sent by the receiver to the emitter for key distribution in an autocompensating quantum cryptography system.

Alternatively, both stations can have a time reference unit as shown in FIG. 2. The time reference unit of one of the stations—for example of the receiver—functions as the master time reference unit. The time reference unit of the other station the—emitter in this example—functions as the slave time reference unit. The slave unit is synchronized with the master unit. This is achieved using a communication channel—the synchronization channel—and a synchronization unit. The synchronization signal of the master time reference unit is transmitted over the synchronization channel to the synchronization unit. This transmission can take place continuously or periodically. This unit then generates a correction signal which allows to synchronize the slave time reference unit with the master unit. The synchronization unit can for example consist of a phase locked loop. It can be implemented both in software or in hardware. The synchronization channel can consist for example of an electric cable carrying a varying voltage or an optical fiber transmitting light pulses coincident with the time reference signal. It can also consist of the intense light pulses sent by the receiver to the emitter for key distribution in an autocompensating quantum cryptography system. This remains true when these intense pulses are sent in the form of trains, for example to avoid spurious detections caused by Rayleigh scattering by the use of a storage system by the emitter.

This approach has the advantage of not requiring the emitter to register every pulse sent by the emitter. Even if a pulse is not detected by the emitter, all the signals will be properly generated because they are based on a time reference. Such an event thus does not cause a shift of the sequences of bits of the emitter and the receiver.

It also allows to generate delays larger than the time difference between subsequent light pulses as a combination of a number of time reference pulses and a small additional delay.

Finally the fact that the time reference source of the emitter is periodically resynchronized with that of the receiver allows to reduce the constraints on the accuracy of these sources.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for synchronizing an emitter and a receiver in an autocompensating quantum cryptography system comprising:

two stations, one station being a quantum cryptography emitter, the other station being a quantum cryptography receiver, one channel linking the two stations, wherein the one channel is a quantum cryptography channel linking the quantum cryptography emitter with the quantum cryptography receiver as well as a synchronization channel connecting the quantum cryptography emitter and the quantum cryptography receiver, wherein the quantum cryptography emitter comprises an attenuator, a first time reference unit provided with one station, a second time reference unit provided with said other station, a synchronization unit provided with the second time reference unit in said other station, wherein the first time reference unit generates a synchronization signal at said one station and transmits it through said synchronization channel to said other station, wherein the second time reference unit operates as a slave unit and is synchronized with the first time reference unit operating as the master unit by a correction signal provided by the synchronization unit using information exchanged over the synchronization channel, wherein the timing of the electronic signals within the quantum cryptography system is based upon said master time reference signal, and wherein time reference of said synchronization signal generated by the first time reference unit consists of trains of intense pulses sent by the receiver to the emitter for key distribution in the autocompensating cryptography system through attenuation of the intense pulses through the attenuator of the emitter to a quantum level and reflection to the receiver.

2. The apparatus according to claim 1, wherein the synchronization channel transmits the said synchronization signal continuously.

3. The apparatus according to claim 1, wherein the synchronization channel transmits the said synchronization signal periodically.

4. The apparatus according to claim 1, wherein the synchronization channel uses the same optical fiber line as the quantum cryptography channel.

5. The apparatus according to claim 1, wherein said timing of electronic signals is obtained by counting pulses of said time reference unit and adding a defined adjustable delay.

6. The apparatus according to claim 5, wherein said defined adjustable delay is shorter than the period of the time reference signal.

7. The apparatus according to claim 1, wherein said synchronization unit is a PLL-unit.

8. The apparatus according to claim 1, wherein said timing of electronic signals within the quantum cryptograph emitter is obtained by counting pulses of said time reference unit and adding a first defined adjustable delay, and said timing of electronic signals within the quantum cryptograph receiver is obtained by counting pulses of said time reference unit and adding a second defined adjustable delay.

9. A method for synchronizing an emitter and a receiver in an autocompensating quantum cryptography system, said method comprising:

communicating on a single channel being a quantum cryptography and synchronization channel between two stations, one station being a quantum cryptography emitter, the other station being a quantum cryptography receiver, generating a master time reference signal at said one station with a time reference unit, transmitting said master time reference signal as a train of intense pulses through said one channel to said other station, and using said master time reference signal for the timing of electronic signals within the quantum cryptography emitter and the quantum cryptography receiver wherein the master time reference signal is used within said other station within a synchronization unit as a synchronization signal to synchronize a further time reference unit provided within said other station with said time reference unit of said one station operating as the master unit for the timing of electronic signals within the quantum cryptography system, wherein time reference of said synchronization signal generated by the fist time reference unit consists of said train of intense pulses sent by the receiver to the emitter for key distribution through attenuation to a quantum level by the receiver and reflection to the emitter.

* * * * *